(12) United States Patent
Yost et al.

(10) Patent No.: US 9,575,639 B2
(45) Date of Patent: Feb. 21, 2017

(54) COMPOUND CONTROLS

(71) Applicant: Ab Initio Technology LLC, Lexington, MA (US)

(72) Inventors: Gregg Yost, Waltham, MA (US); Joshua Goldshlag, Arlington, MA (US)

(73) Assignee: Ab Initio Technology LLC, Lexington, MA (US)

( * ) Notice: Subject to any disclaimer, the term of this patent is extended or adjusted under 35 U.S.C. 154(b) by 191 days.

(21) Appl. No.: 14/192,184

(22) Filed: Feb. 27, 2014

(65) Prior Publication Data

US 2015/0242093 A1  Aug. 27, 2015

(51) Int. Cl.
| | |
|---|---|
| *G06F 9/44* | (2006.01) |
| *G06F 3/0484* | (2013.01) |
| *G06F 3/0482* | (2013.01) |
| *G06F 3/0481* | (2013.01) |

(52) U.S. Cl.
CPC ........ *G06F 3/04842* (2013.01); *G06F 3/0482* (2013.01); *G06F 3/04817* (2013.01); *G06F 8/34* (2013.01)

(58) Field of Classification Search
None
See application file for complete search history.

(56) References Cited

U.S. PATENT DOCUMENTS

| | | | |
|---|---|---|---|
| 5,537,630 A * | 7/1996 | Berry ........................ | G06F 8/34 715/763 |
| 7,062,718 B2 * | 6/2006 | Kodosky ............ | G05B 19/0426 703/21 |
| 7,668,608 B2 * | 2/2010 | Nixon ................ | G05B 19/0426 700/87 |
| 2003/0035005 A1 * | 2/2003 | Kodosky ............ | G05B 19/0426 715/763 |
| 2003/0037322 A1 * | 2/2003 | Kodosky ............. | G06F 3/04817 717/162 |
| 2010/0011311 A1 * | 1/2010 | Kodosky ............ | G05B 19/0426 715/771 |

(Continued)

OTHER PUBLICATIONS

International Search Report and Written Opinion, PCT/US2015/017222, May 13, 2015, 13 pages.

(Continued)

*Primary Examiner* — Chameli Das
(74) *Attorney, Agent, or Firm* — Fish & Richardson P.C.

(57) ABSTRACT

Methods, systems, and apparatus, including computer programs encoded on computer storage media, for specifying a compound control. One of the methods includes identifying a first application. The method includes displaying a canvas. The method includes displaying, in the canvas, a first display object associated with the first application. The method includes identifying a second application, the second application being a computer executable program. The method includes displaying, in the user interface, a second display object associated with a second application. The method includes, in response to a user action that associates the second display object with the first display object, configuring the first application to invoke the second application. The method includes creating a third display object that includes the first set of selector objects and the second set of selector objects.

27 Claims, 7 Drawing Sheets

(56) References Cited

U.S. PATENT DOCUMENTS

| | | | |
|---|---|---|---|
| 2010/0103118 A1* | 4/2010 | Townsend | G06F 3/0488 |
| | | | 345/173 |
| 2012/0185821 A1* | 7/2012 | Yaseen | G06F 8/10 |
| | | | 717/105 |
| 2012/0235921 A1* | 9/2012 | Laubach | G06F 3/0238 |
| | | | 345/172 |
| 2015/0067497 A1* | 3/2015 | Cieplinski | G06F 3/016 |
| | | | 715/702 |
| 2015/0178930 A1* | 6/2015 | Gao | G06F 17/2765 |
| | | | 382/103 |
| 2015/0193406 A1* | 7/2015 | Lemonik | G06F 17/24 |
| | | | 715/256 |
| 2015/0205450 A1* | 7/2015 | Howett | G06F 3/0481 |
| | | | 715/747 |
| 2015/0235387 A1* | 8/2015 | Du | G06T 11/001 |
| | | | 345/594 |

OTHER PUBLICATIONS

International Preliminary Report on Patentability, PCT/US2015/017222, Aug. 30, 2016 (11 pages).

\* cited by examiner

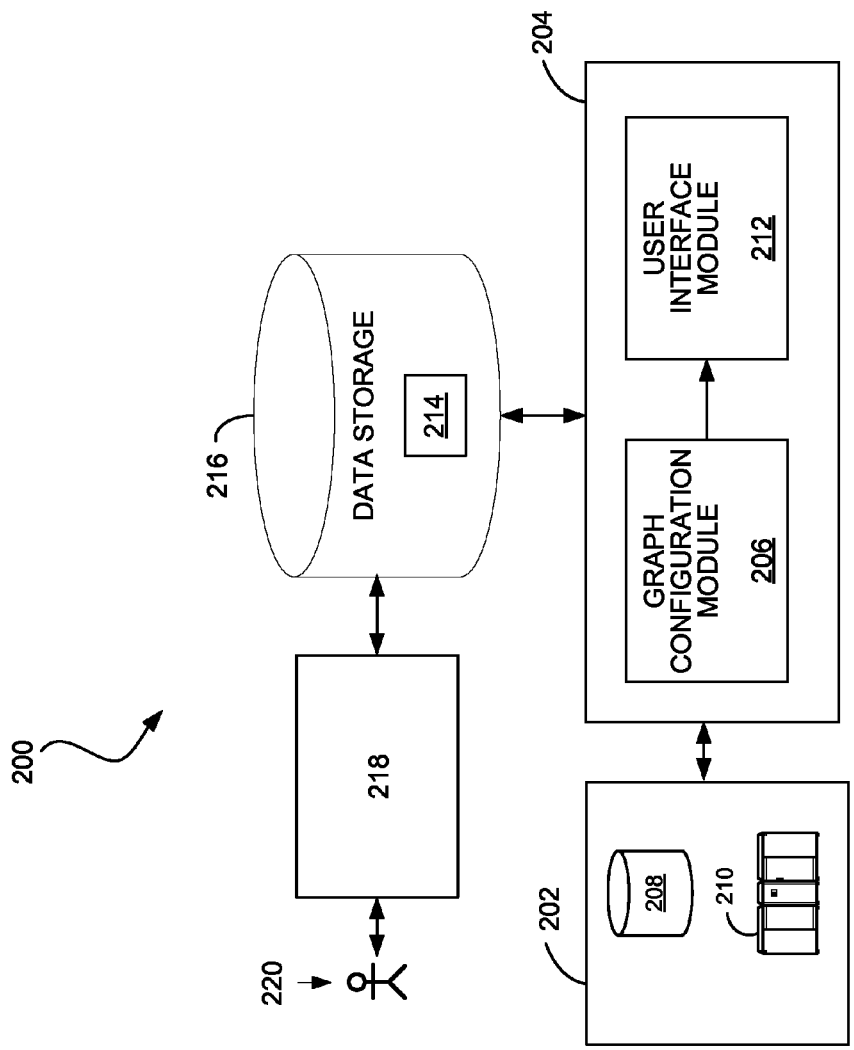

COMPOUND CONTROLS

BACKGROUND

This description relates to graphical user interfaces.

A graphical user interface (GUI) allows users to interact with a computer or similar device through graphical icons and visual indicators. A user can interact with a GUI by interacting with the graphical icons presented on a display. A GUI can be used to allow a user to provide data values to a data processing system.

Complex computations can often be expressed as a data flow through a directed graph (called a "dataflow graph"), with components of the computation being associated with the vertices of the graph and data flows between the components corresponding to links (arcs, edges) of the graph. The components can include data processing components that receive data at one or more input ports, process the data, and provide data from one or more output ports, and dataset components that act as a source or sink of the data flows. Dataflow graphs may be configured using parameters. A system that implements such graph-based computations is described in U.S. Pat. No. 5,966,072, EXECUTING COMPUTATIONS EXPRESSED AS GRAPHS.

SUMMARY

In general, one innovative aspect of the subject matter described in this specification can be embodied in methods that include the actions of identifying a first application, the first application being a computer executable program. The methods include the action of displaying, in a user interface, a canvas for displaying one or more display objects. The methods include the actions of displaying, in the canvas, a first display object associated with the first application; wherein the first display object includes a first set of selector objects and includes a mapping between first set of selector objects and one or more parameters of the first application. The method includes the actions of identifying a second application, the second application being a computer executable program. The method includes the action of displaying, in the user interface, a second display object associated with a second application, wherein the second display object includes a second set of selector objects and includes a mapping between the second set of selector objects and one or more parameters of the second application. The methods include the actions of in response to a user action that associates the second display object with the first display object, configuring the first application to invoke the second application. The methods include the actions of creating a third display object that includes the first set of selector objects and the second set of selector objects.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of reading the second display object from a file. The method may include the actions of generating a third application for configuring the first application and the second application using the user interface. The third application may include a first display object and a second display object. Changing a value associated with the first display object may change a value associated with the second display object. The first application may be a first dataflow graph and the second configurable application may be a second dataflow graph. The associating the second application with the first application may include configuring the first dataflow graph to execute the second dataflow graph.

Aspects can include one or more of the following advantages. Graphical user interfaces can be more easily designed and maintained when compared to conventional methods. Dataflow graphs can be easily configured to call and execute other dataflow graphs. Changes to a compound control can be isolated from changes to other controls or user interfaces. Standard controls can be created and optimized to increase performance. Controls can include embedded logic. Reusing controls in different interfaces can enable the reuse of the embedded logic.

Other features and advantages of the invention will become apparent from the following description, and from the claims.

DESCRIPTION OF DRAWINGS

FIG. 2 shows an exemplary data processing system for creating and using compound controls.

DESCRIPTION

Figure 1:
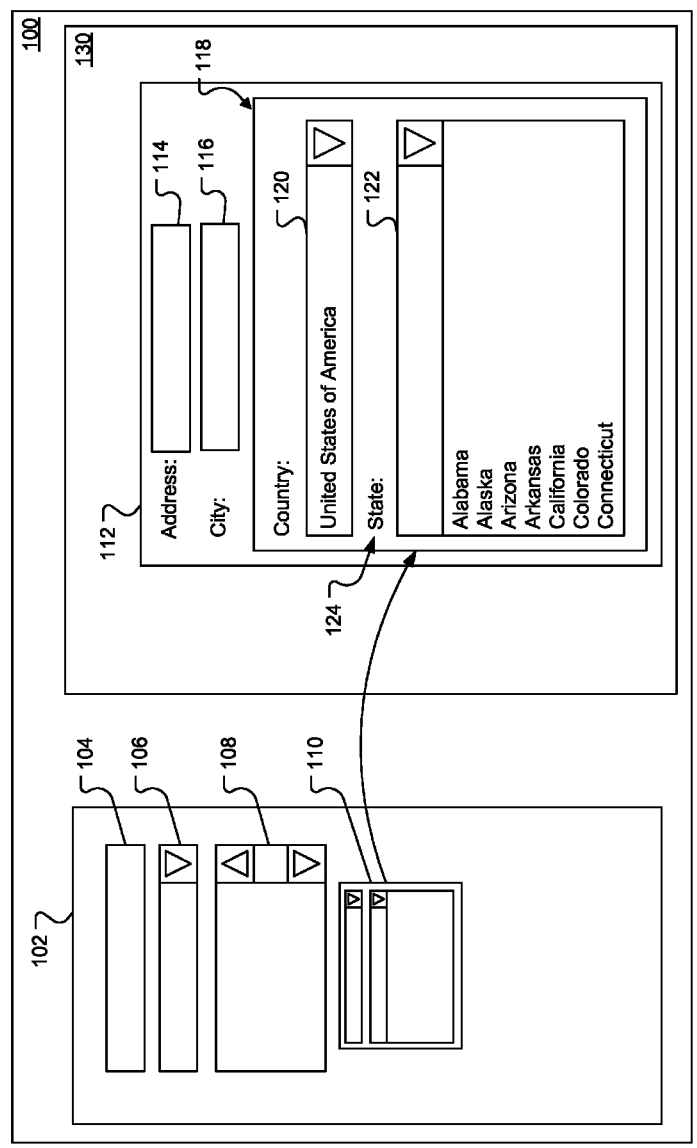
FIG. 1 illustrates an example of a compound control.

FIG. 1 illustrates an example of a compound control. A graphical user interface (GUI) development environment 100 can include a palette 102 of controls. The palette 102 includes one or more controls that can be selected from the palette and added to an interface. For example, the palette 102 includes a text box representation 104, a drop down list box representation 106, a list box representation 108 and a compound control representation 110.

Selecting a representation from the palette 102, a GUI designer can place the corresponding control on a canvas 130. As used herein, a canvas is a container that holds various drawing elements (lines, shapes, text, frames containing other elements, controls, labels, etc. . . . ). Some implementations also define the spatial representation and allow the user to interact with the elements via a graphical user interface. The GUI development environment can create a user accessible application, web page, or similar presentation mechanism so that controls displayed on the canvas during the design and editing process are very similar in appearance to the presentation of the controls when the application is executed or the web page is accessed.

In this example, the text box representation 104 was selected from the palette 102 and placed on the canvas 130 to create an address text box 114. Similarly, the text box representation 104 was selected from the palette 102 and placed on the canvas 130 to create a city text box 116.

Selecting the compound control representation 110 and placing it on the canvas 130 generates the compound control 118. In general, a compound control contains one or more basic controls. For example, the compound control 118 includes a country drop down list box 120 and a state drop down list box 122. A compound control can also contain one or more other compound controls.

The compound control may also include executable logic. The logic can be related to interactions between the basic controls. For example, the country drop down list box 120 may include a list of different countries. The compound control 118 may include programming logic that causes the state drop down list box 122 to populate with an appropriate list of states/provinces when a user selects a value from the country drop down list box 120. For example, selecting "The United States of America" in the country drop down list box 122 causes the state drop down list box to be populated with a list of the states of the United States. Similarly, selecting "Canada" in the country drop down list box 120 causes the state drop down list box to be populated with a list of the Canadian provinces and territories. Other changes can also occur. For example, the label 124 may change from "State:" to "Province/Territory".

In some implementations, the compound control may also accept parameters. The parameters may be, for example, parameters associated with the basic controls of the compound control. The parameters may also be particular to the compound control as a whole. For example, the GUI designer may be able to set a parameter to identify look up tables or other data sources for the country and state drop down list boxes. Alternatively, the GUI designer may provide a data structure which supplies the requested values, for example, a dictionary data type or a hash table.

In some implementations, the compound control may include limitations as to the context in which the control may be used. For example, some compound controls may be configured to be allowed only in a pop-up window or to only be presented in a main display window.

In some implementations, compound controls can be created in the GUI development environment. For example, the GUI designer may elect to save the items on the canvas as a compound control. The compound control may be saved as a separate file which is accessible by the GUI development environment.

FIG. 2 shows an exemplary data processing system 200 for creating and using compound controls. The system 200 includes a data source 202 that may include one or more sources of data, such as storage devices or connections to online data streams, each of which may store data in any of a variety of storage formats (e.g., database tables, spreadsheet files, flat text files, or a native format used by a mainframe). An execution environment 204 includes a graph configuration module 206 and a user interface module 212. The execution environment 204 may be hosted on one or more general-purpose computers under the control of a suitable operating system, such as the UNIX operating system. For example, the execution environment 204 can include a multiple-node parallel computing environment including a configuration of computer systems using multiple central processing units (CPUs), either local (e.g., multiprocessor systems such as SMP computers) or locally distributed (e.g., multiple processors coupled as clusters or MPPs), or remote, or remotely distributed (e.g., multiple processors coupled via a local area network (LAN) and/or wide-area network (WAN)), or any combination thereof.

The graph configuration module 206 changes the configuration of dataflow graphs, as described in more detail below. The user interface module 212 displays configuration information to a user 220 and receives configuration actions from the user 220. The user interface module 212 also communicates with the graph configuration module 206, which configures dataflow graphs based on the actions of the user 220. For example, the dataflow graphs can be stored in the data source 202. Storage devices providing the data source 202 may be local to the execution environment 204, for example, being stored on a storage medium connected to a computer running the execution environment 204 (e.g., hard drive 208), or may be remote to the execution environment 204, for example, being hosted on a remote system (e.g., mainframe 210) in communication with a computer running the execution environment 204 over a local or wide area data network.

The execution environment 204 is in communication with a data storage system 216 which contains information used by the user interface module 212 to display a user interface. The data storage system 216 is also accessible to a development environment 218 in which a developer 220 is able to develop user interfaces that are stored in the data storage system 216 and used by the user interface module 212 to display a user interface.

The data source 202 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "MANAGING PARAMETERS FOR GRAPH-BASED APPLICATIONS," incorporated herein by reference.

A dataflow graph can be considered a computer program executed within a dataflow graph execution environment that processes data from one or more data sources. The data from the data sources are manipulated and processed according to the dataflow graph and exported to one or more data sinks. Data sources and sinks can include files, databases, data streams, or queues, for example. Dataflow graphs are represented as directed graphs that include nodes representing data processing components with each including code for processing data from at least one data input and providing data to at least one data output and nodes representing dataset objects for accessing the data sources and/or sinks. The nodes are connected by directed links representing flows of data between the components, originating at the data sources and terminating at the data sinks. The data output ports of upstream components are connected to the data input ports of downstream components. The dataflow graphs may be reused for different data sources and different data sinks represented by the dataset objects. For example, the data structures and program code used to implement dataflow graphs can support multiple different configurations by being parameterized to enable different sources and sinks to be substituted readily. Furthermore, in some arrangements, the flow of the dataflow graph may be altered by the use of parameters, such that a component or a series of components may be bypassed. In general, a parameter represents a property of a dataflow graph that can be configured or changed. An example of a property is "input file," the value of which identifies a data file that acts as a data source for the dataflow graph. The property can be changed between uses of the dataflow graph, and the dataflow graph may perform operations differently as a result of the change. A dataflow graph can be configured at compile time, by altering the graph pre-compilation to perform a particular action or at run-time, by setting parameters or altering configuration files that are used by the dataflow graph.

Figure 3A:
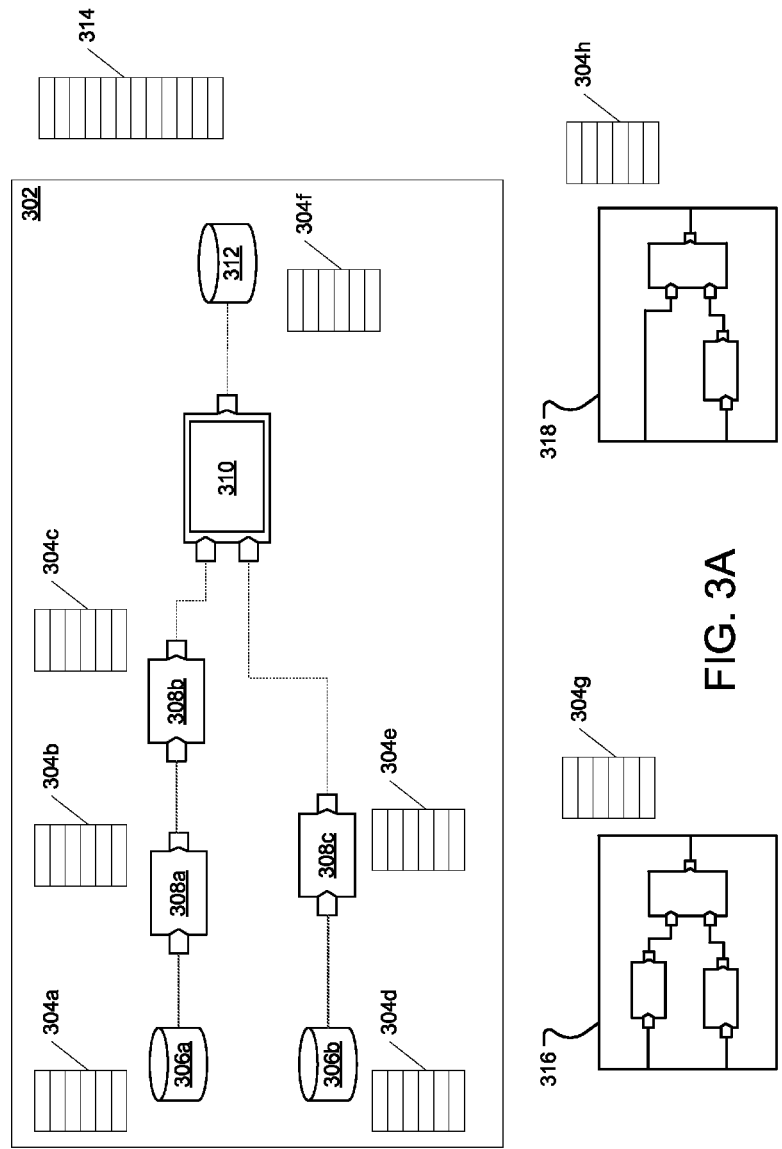
FIG. 3A shows an example of a dataflow graph and parameters.

For example, referring to FIG. 3A a dataflow graph 302 may include data sources 306a, 306b, components 308a-c, a graph interface component 310 and a data sink 312. Each of the sources, components, and the sink may be associated with a set of parameters 304a-f. A parameter for one source, component, or sink may be used to evaluate a parameter for a different source, component, or sink. In this example, the sources 306a, 306b are connected to the input ports of components 308a, 308c. The output port of component 308a is connected to the input port of component 308b, and the output port of graph interface component 310 is connected to data sink 312. The connections between the sources, components, and sinks define the data flow.

A graph interface component 310 is a component of a graph that enables the graph to execute another graph dynamically at the time of execution. For example, at the time the data flow graph 302 is executed, the graph interface component 310 may dynamically load and execute dataflow graph 316 or dataflow graph 318. In some implementations, the graph interface component 310 may define an interface that accepts input flows of data and produces output flows of data. The dataflow graph that is loaded and executed may be determined based on a parameter, a data value from a data element, or any other value.

Some of the data sources, components, or sinks may have input parameters 304a-f which may define some of the behavior of the graph. For example, a parameter may define the location of the data source or sink on a physical disk. A parameter may also define the behavior of a component; for example, a parameter may define how a sorting component sorts the input. In some arrangements, the value of one parameter may depend upon the value of another parameter. For example, a source 306a may be stored in a file in a particular directory. The parameter set 304a may include a parameter called "DIRECTORY" and another called "FILENAME". In this case the FILENAME parameter would depend upon the DIRECTORY parameter (e.g., DIRECTORY may be "/usr/local/" and FILENAME may be "/usr/local/input.dat"). Parameters may also depend upon the parameters for other components. For example, the physical location of a sink 312 may depend upon the physical location of the source 306a. In this example, the sink 312 includes a set of parameters 304f which includes a FILENAME parameter which depends upon the DIRECTORY parameter of the source 306a; for example, the FILENAME parameter in the set 304f may be "/usr/local/output.dat" where the value "/usr/local/" is obtained from the DIRECTORY parameter in the set 304a.

Similarly, dataflow graphs 316 and 318 may have parameter sets 304g and 304h respectively.

In some implementations, the parameters sets 304a-f may be combined into a single parameter set that contains the parameters for the entire dataflow graph, for example, the parameter set 314. However, because the graph interface component 310 dynamically loads and executes a dataflow graph at run time, the entire parameter list may not be known. For example, if the graph interface component 310 were to cause the dataflow graph 316 to load and execute, the parameter set 304g may need to be populated.

A parameter set, for example the parameter set 314, may be published or otherwise made available for use in a development environment, for example, the development environment 218 of FIG. 2. The published parameter set may be referred to as part of an application programming interface (API) of the dataflow graph.

A configuration interface, presented on a client device, enables a user 220 to access the graph configuration module 206 of FIG. 2. Referring again to FIG. 3, within the configuration interface the parameters of the parameter sets 304a-304f or the parameter set 314 may be reorganized into different groups for interacting with a user, which reflect business considerations rather than technical ones. The configuration interface for receiving values for the parameters based on user input can display different parameters according to relationships among the parameters in a flexible way that is not necessarily restricted by aspects of the development environment on the server.

The construction of a dataflow graph can be highly technical in nature in some cases. While written to achieve specific business ends, the underlying structure and construction of the graph is determined based upon technical considerations. For example, graph components may be selected to maximize reusability or to support parallel processing. On the other hand, how and where a graph is used may be largely a business decision. Some of the parameters associated with a parameterized dataflow graph can be used to enable business users to customize dataflow graphs without requiring the user to understand the technical complexities behind their implementations. The parameterized dataflow graphs simplify customization and facilitate reuse. A configuration interface for identification of parameter values for constructing a dataflow graph can be presented on a client machine. For example, such an environment is described in more detail in U.S. Publication No. 20011/0145748, entitled "SPECIFYING USER INTERFACE ELEMENTS," incorporated herein by reference.

A configuration interface can also be used to configure execution flow graphs. An execution flow graph is a directed graph that describes an order in which external processes are to be executed. For example, an execution flow graph can specify the order in which a sequence of data flow graphs are to be executed.

The development of the configuration interface for identification of parameter values to construct a dataflow graph can also be highly technical in nature in some cases. As described above, the underlying graphs are often constructed based on technical considerations, while the configuration interface is often developed based on business considerations. As a consequence, a configuration interface may provide parameters for one or more data flow graphs. Each dataflow graph has a separate parameter set provided by the API. Further, the development of the configuration interface includes different skills from the development of the underlying data flow graph. Therefore, the development of the configuration interface requires a combination of technical, business, and usability considerations.

To facilitate the generation of a configuration interface, a builder interface may be presented to a user of a client machine. The builder interface may be part of the development environment 218.

Figure 3B:
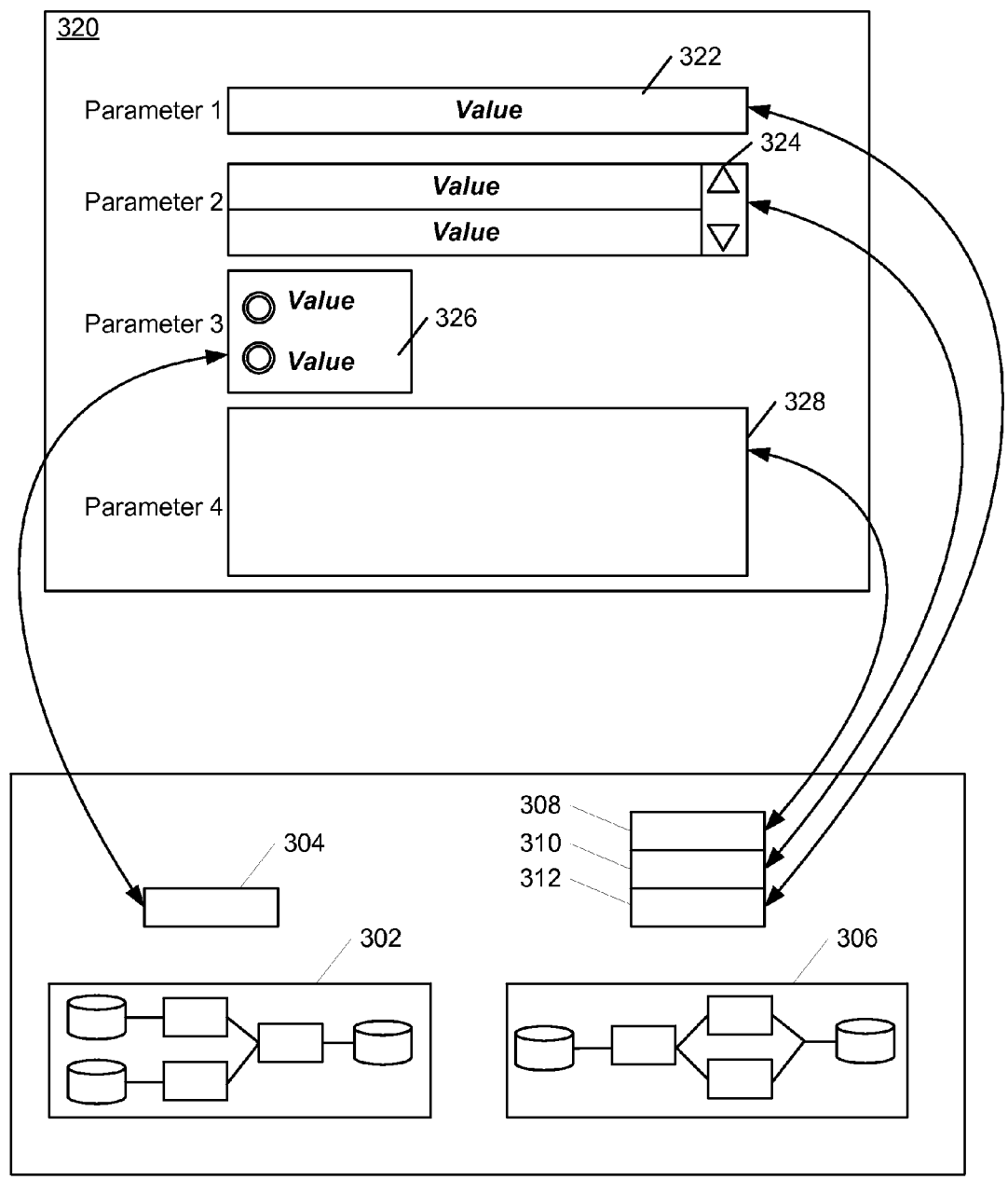
FIG. 3B illustrates an exemplary configuration interface for setting parameters on a configurable application, such as a configurable dataflow graph.

FIG. 3B illustrates an exemplary configuration interface for setting parameters on a configurable application, such as a configurable dataflow graph. In this example, two data flow graphs 302 and 306, shown in the interface 320, are associated with the configuration interface 320. In this example, configurable dataflow graph 302 can be configured using parameter 304. Similarly, dataflow graph 306 can be configured using parameters 308, 310, 312.

For example, a configuration interface 320 allows a user that has business knowledge of the data to be processed by the dataflow graphs, to assign values to the parameters and thereby configure both dataflow graphs using a single configuration interface. In this example, the configuration interface 320 includes a parameter 1 field 322. The parameter 1 field is used to assign a value to the parameter 312 represented in the interface 320. Similarly, a parameter 2 field 324 is used to assign a value to parameter 310. A parameter 3 field is used to assign a value to parameter 304. A parameter 4 field 328 is used to assign a value to parameter 308.

The parameter fields can be selected based on the type of data to be entered. For example, the parameter 1 field 322 is a textbox that allows the user to enter any value (e.g., integers, floating point values, etc.). The parameter 2 field 324 is a list box that allows the user to select a value from a list. The parameter 3 field 326 is a radio button box that allows a user to select a value from a small number of options (in this example, two option values). The parameter 4 field 328 is a larger textbox that allows a user to enter a larger amount of text.

Other GUI controls can be selected. For example, a user may be able to open a file selector to select a particular input file or a location from which the file is to be downloaded over a network.

Figure 4:
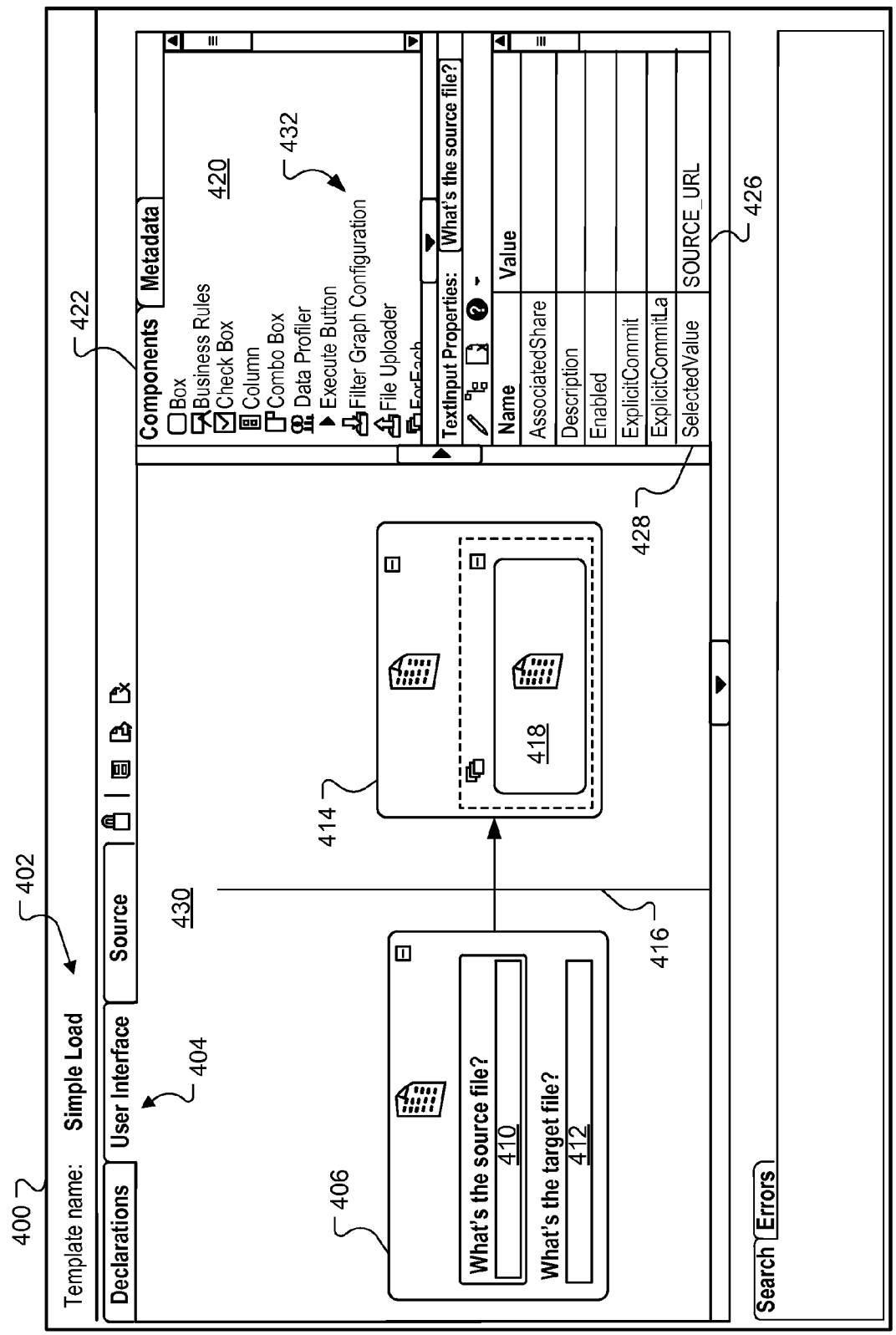
FIG. 4 illustrates an example of a builder interface 400 for creating configuration interfaces with a focus on GUI controls.

FIG. 4 illustrates an example of a builder interface 400 for creating configuration interfaces with a focus on GUI controls. The builder interface 400 includes a template name 402. The template name 402 identifies the configuration interface that is being created. A user interface tab 404 of the builder interface 400 includes a display area 430. The display area presents a "what you see is what you get" (WYSIWYG) interface for the construction of the configuration interface. The display area 430 may be thought of as a canvas upon that the developer places GUI controls. A developer can select a GUI control from the components section 422 and add it to the display area 430 to create a configuration interface. In this example, the display area 430 includes a box control 406 which includes a text input control 410 corresponding to a source file and a text input control 412 corresponding to a target file. The display area 430 also includes a box control 414 that includes a file selector control 418. The display area may partition the GUI into sections using dividers, such as divider 416. The partitions may be used to simplify the creation of an interface by providing a basic structure to the user.

The component section 422 includes the different controls that can be added to the display area 430. Available GUI controls include input controls which accept user input and assign values to parameters. Available GUI controls also include grouping controls, such as a box, that creates a visual outline grouping one or more controls. A developer may also select rules-based controls that enable a developer to create inter-field dependencies. For example, a business rules control enables a developer to configure a parameter that provides a mapping between the output of the business rules control and a parameter that is used to configure the configurable application. A developer may also select data-based controls that enable a user of the configuration interface to view the data produced by the graph.

The component section 422 can also include compound controls. For example, the Filter Graph Configuration 432 may be a compound control that includes primitive controls and executable instructions sufficient to configure a Filter Graph. In general, a primitive control is an element of a graphical user interface (GUI) that displays an information arrangement changeable by the user, such as a window or a text box. Primitive controls are basic visual building blocks which, combined in an application, hold all the data processed by the application and the available interactions on this data.

Each control can have one or more attributes. These attributes may be displayed in a control attribute area 426. In this example, the control attribute area 426 displays attributes for the text input control 410. The control attribute area 426 enables a user to assign a parameter value to any of the property values for a control. For example, the selected value property 428 provides the value for the SOURCE_URL parameter 430.

The developer can also establish rules that dictate other graphical characteristics of the configuration interface. For example, a developer may specify that a particular GUI control not be displayed unless a predefined set of criteria is met; for example, the target file control 412 may not display unless the source file control 410 is populated.

In some implementations, rules may also be specified within a compound control. For example, the compound control may specify that a particular primitive control in the compound control not be displayed unless a predefined set of criteria is met. In another example, as described above, a primitive control in the compound control may be populated based on a value provided in another primitive control.

Figure 5:
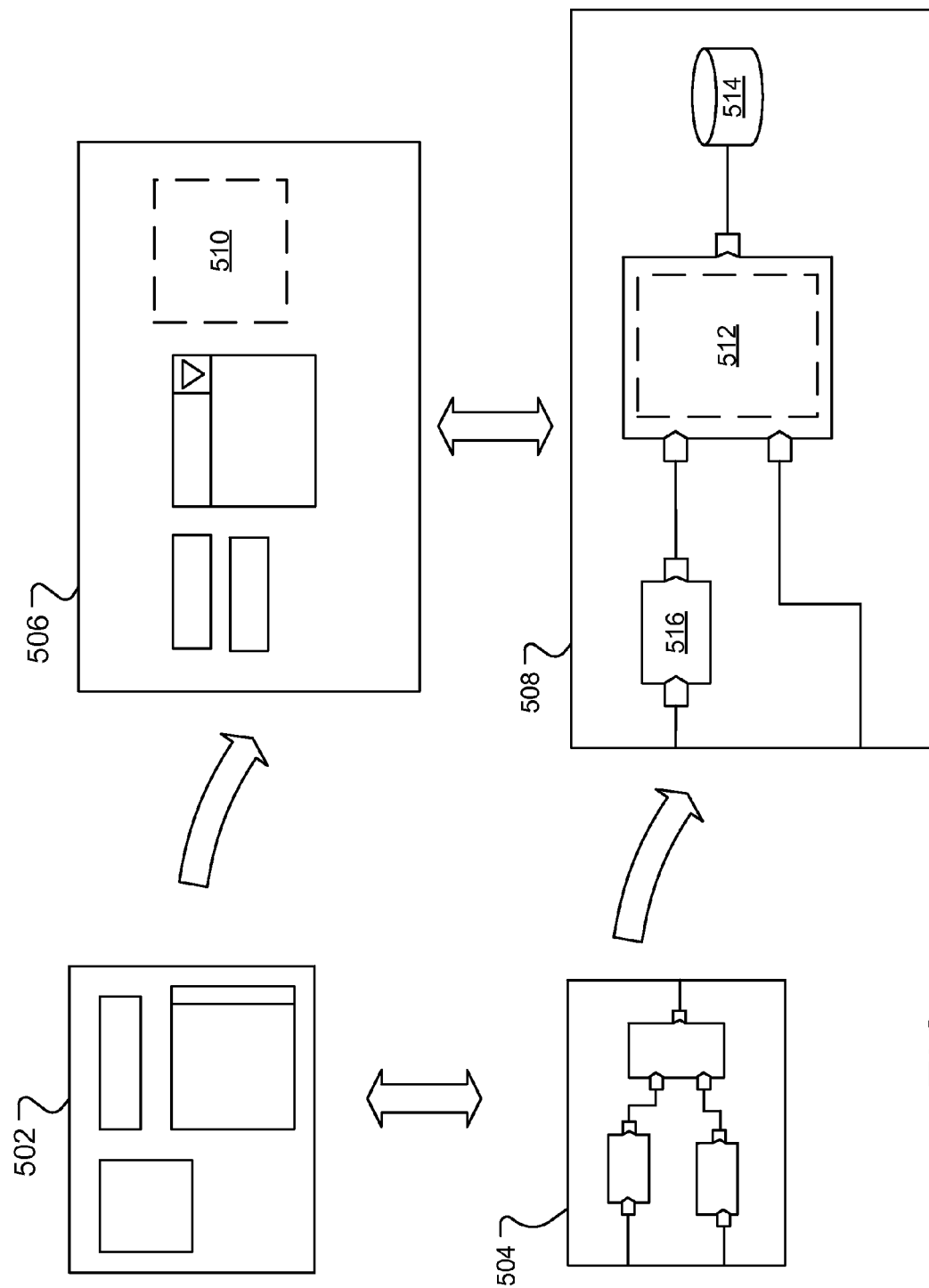
FIG. 5 illustrates associating a data flow graph with another data flow graph using a compound control.

Referring to FIG. 5, a compound control can be created to set parameters associated with a dataflow graph. As discussed above, a user interface can be used to configure parameters of a dataflow graph. In this example, a compound control 502 includes fields that allow a user to set parameters associated with a dataflow graph 504. As discussed above, the compound control can include programming instructions that control interactions between the basic controls that make up the compound control and other logic. In this example, the compound control 502 includes programming instructions that set the parameters for the dataflow graph 504. The user interface 506 represents a display area of a builder interface; for example, the user interface 506 may be the display area 430 of the builder interface 400 of FIG. 4.

The user interface 506 includes an area 510 where the compound control may be placed. In some implementations, the user interface 506 may include a template which directs and limits how controls may be placed. For example, the user interface 506 may limit the placement of controls in a tabular form. Alternatively, the user interface 506 may divide the user interface 506 into distinct sections with each section capable of holding one or more controls. In other implementations, the user interface 506 may allow a user to configure the controls anywhere on the user interface 506.

In this example, the user interface 506 is designed to set parameters for a dataflow graph 508. A portion of the dataflow graph 506 includes a component 516. The component 516 is connected to a graph interface component 512. As discussed above, the graph interface component 512 is configured to execute several different potential data flow graphs. The graph interface component 512 is connected to a data sink 514.

When creating a GUI for configuring the dataflow graph 508, the user may select the dataflow graph that is to be executed by the graph interface component 512. In this example, the user determines that dataflow graph 504 should be executed by graph interface component 512.

The user can associate the dataflow graph 504 with the graph interface component 512 by selecting the compound control 502 associated with the dataflow graph 504 and placing it in the area 510. Adding the compound control 502 creates an area in the user interface where a business user may configure the data flow graph 508 and the dataflow graph 504. For example, the user interface 506 may be saved or exported and later accessed by a business user. The business user is presented with the completed user interface. By supplying values in the fields of the user interface 506, the business user configures the dataflow graph 508, including the dataflow graph 504.

In some implementations, the area 510 is associated with the graph interface component 512. In another implementation, the system determines the appropriate graph interface component to associate with the dataflow graph based on an interface associated with both the graph interface component and the dataflow graph. For example, the dataflow graph 504 requires two flows of input data and generates one flow of output data. The area 510 can be filled with any compound control that is associated with a dataflow graph that meets that criteria.

In some implementations, the compound control may be bound to a graph parameter that associated the compound control with a subgraph.

In some implementations, the compound control may be associated with multiple data flow graphs. For example, the compound control may include a selection field (for example, a list box, a drop down list box, etc.) that enables a business user to select which dataflow graph should be executed by the graph interface component 512. When the business user selects a dataflow graph from the selection field the compound control may present a set of fields that are appropriate for configuring the selected data flow graph.

Figure 6:
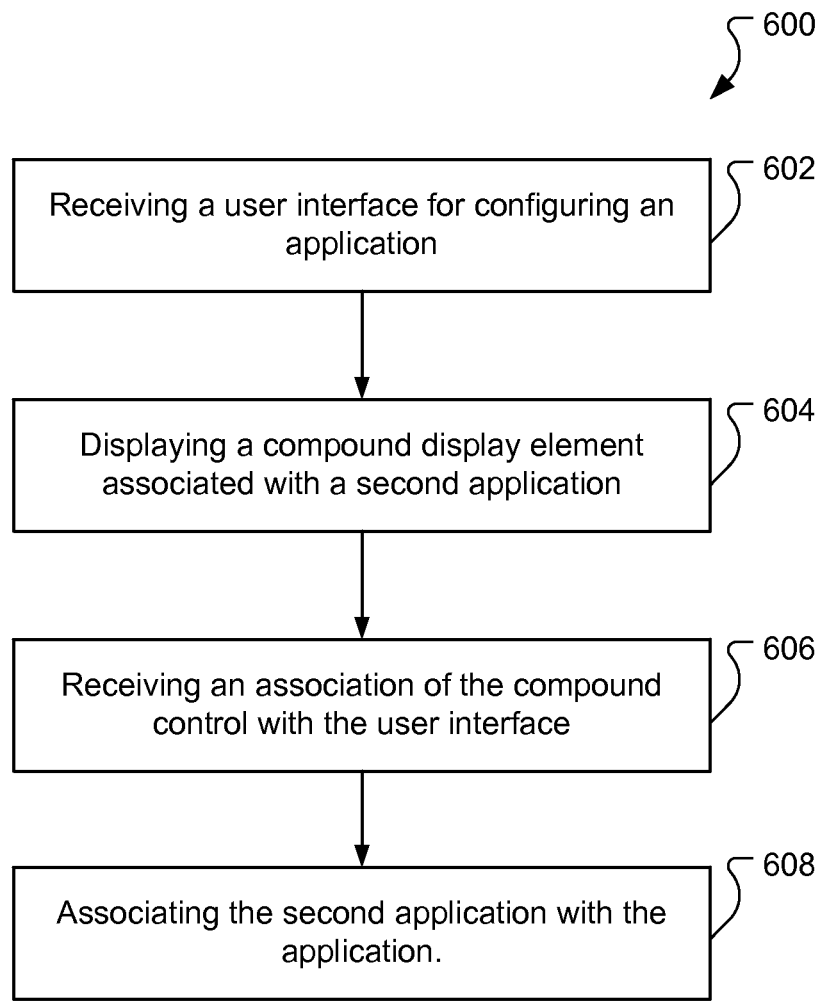
FIG. 6 is a flow chart of an example process for configuring an application using compound display elements.

FIG. 6 is a flow chart of an example process for configuring an application using compound display elements. For example, the process may be performed by a data processing apparatus such as a computer system. For simplicity, the process will be described with respect to a system performing the process.

A user interface for configuring an application can be received (602). The user interface can be created using a builder interface. The builder interface can include, among other things, a palette for the presentation of controls and display elements which may be added to the user interface.

A compound display element associated with a second application can be displayed (604). The compound display element may be presented in the palette to a user. The compound display element can include one or more display elements that can be used to configure the second application.

An association between the compound display element and the user interface can be received (606). The association can occur because of the actions of a user. For example, the user may select an icon representing the compound control from the palette and drag and drop the compound control on the user interface.

The second application can be associated with the application (608). In response to receiving the association of the compound control with the user interface, the system can associate the second application with the application.

The graphical user interface that uses the compound controls approach described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A computer-implemented method including:
   identifying a first application, the first application being a computer executable program;
   displaying, in a user interface, a first display object associated with the first application, wherein the first display object includes a first set of selector objects displayed in the first display object and includes a mapping between the first set of selector objects and one or more parameters of the first application, wherein a selector object is configured for input of a value of at least one of the one or more parameters mapped to that selector object;
   identifying a second application, the second application being a computer executable program;
   displaying, in the user interface, a second display object associated with a second application, wherein the second display object includes a second set of selector objects and includes a mapping between the second set of selector objects and one or more parameters of the second application; and in response to receiving an indication of a user action that associates the second display object with the first display object, configuring the first application to invoke the second application; and creating a third display object that includes the first set of selector objects and the second set of selector objects;

wherein the first display object that includes the first set of selector objects mapped to one or more parameters of the first application is displayed in the graphical user interface independent of an indication of a relationship between the first display object and the first application to which the first set of selector objects are mapped, independent of an indication of a relationship between the first set of selector objects and the first application to which the first set of selector objects are mapped and independent of an indication of a relationship between the first application and the second application.

2. The method of claim 1, further including reading the second display object from a file.

3. The method of claim 1, further including generating a third application for configuring the first application and the second application using the user interface.

4. The method of claim 3, wherein the third application includes a first display object and a second display object; and changing a value associated with the first display object changes a value associated with the second display object.

5. The method of claim 1, wherein the first application is a first dataflow graph and the second configurable application is a second dataflow graph.

6. The method of claim 5, including associating the second application with the first application by configuring the first dataflow graph to execute the second dataflow graph.

7. The method of claim 1, wherein input of the value includes selection of the value.

8. The method of claim 1, wherein creating the third display object includes saving the first set of selector objects in the first display object and the second set of selector objects in the second display object as a third display object; and at a time that is subsequent to the saving, causing display of the third display object in another graphical user interface.

9. The method of claim 1, further comprising changing a value associated with the first display object;

wherein changing the value associated with the first display object changes a value associated with the second display object.

10. The method of claim 1, further comprising changing a value associated with the first display object;

wherein changing the value associated with the first display object changes an identification of the second application.

11. A non-transitory computer storage medium encoded with computer program instructions that when executed by one or more computers cause the one or more computers to perform operations including:

identifying a first application, the first application being a computer executable program;

displaying, in a user interface, a first display object associated with the first application, wherein the first display object includes a first set of selector objects displayed in the first display object and includes a mapping between the first set of selector objects and one or more parameters of the first application, wherein a selector object is configured for input of a value of at least one of the one or more parameters mapped to that selector object;

identifying a second application, the second application being a computer executable program;

displaying, in the user interface, a second display object associated with a second application, wherein the second display object includes a second set of selector objects and includes a mapping between the second set of selector objects and one or more parameters of the second application; and in response to receiving an indication of a user action that associates the second display object with the first display object, configuring the first application to invoke the second application; and creating a third display object that includes the first set of selector objects and the second set of selector objects;

wherein the first display object that includes the first set of selector objects mapped to one or more parameters of the first application is displayed in the graphical user interface independent of an indication of a relationship between the first display object and the first application to which the first set of selector objects are mapped, independent of an indication of a relationship between the first set of selector objects and the first application to which the first set of selector objects are mapped and independent of an indication of a relationship between the first application and the second application.

12. The medium of claim 11, wherein the operations further include reading the second display object from a file.

13. The medium of claim 11, wherein the operations further include generating a third application for configuring the first application and the second application using the user interface.

14. The medium of claim 13, wherein the third application includes a first display object and a second display object; and changing a value associated with the first display object changes a value associated with the second display object.

15. The medium of claim 11, wherein the first application is a first dataflow graph and the second configurable application is a second dataflow graph.

16. The medium of claim 15, wherein the associating the second application with the first application includes configuring the first dataflow graph to execute the second dataflow graph.

17. The medium of claim 11, wherein the operations further comprise changing a value associated with the first display object;

wherein changing the value associated with the first display object changes a value associated with the second display object.

18. The medium of claim 11, wherein the operations further comprise changing a value associated with the first display object;

wherein changing the value associated with the first display object changes an identification of the second application.

19. A system comprising:

one or more computers and one or more storage devices storing instructions that are operable, when executed by the one or more computers, to cause the one or more computers to perform operations comprising:

identifying a first application, the first application being a computer executable program;

displaying, in a user interface, a first display object associated with the first application, wherein the first display object includes a first set of selector objects displayed in the first display object and includes a mapping between the first set of selector objects and one or more parameters of the first application, wherein a selector object is configured for input of a value of at least one of the one or more parameters mapped to that selector object;

identifying a second application, the second application being a computer executable program;

displaying, in the user interface, a second display object associated with a second application, wherein the second display object includes a second set of selector objects and includes a mapping between the second set of selector objects and one or more parameters of the second application; and in response to receiving an indication of a user action that associates the second display object with the first display object, configuring the first application to invoke the second application; and creating a third display object that includes the first set of selector objects and the second set of selector objects;

wherein the first display object that includes the first set of selector objects mapped to one or more parameters of the first application is displayed in the graphical user interface independent of an indication of a relationship between the first display object and the first application to which the first set of selector objects are mapped, independent of an indication of a relationship between the first set of selector objects and the first application to which the first set of selector objects are mapped and independent of an indication of a relationship between the first application and the second application.

20. The system of claim 19, wherein the operations further include reading the second display object from a file.

21. The system of claim 19, wherein the operations further include generating a third application for configuring the first application and the second application using the user interface.

22. The system of claim 21, wherein the third application includes a first display object and a second display object; and changing a value associated with the first display object changes a value associated with the second display object.

23. The system of claim 19, wherein the first application is a first dataflow graph and the second configurable application is a second dataflow graph.

24. The system of claim 23, wherein the associating the second application with the first application includes configuring the first dataflow graph to execute the second dataflow graph.

25. The system of claim 19, wherein the operations further comprise changing a value associated with the first display object;
wherein changing the value associated with the first display object changes a value associated with the second display object.

26. The system of claim 19, wherein the operations further comprise changing a value associated with the first display object;
wherein changing the value associated with the first display object changes an identification of the second application.

27. A system comprising:
means for identifying a first application, the first application being a computer executable program;
means for displaying, in a user interface, a first display object associated with the first application, wherein the first display object includes a first set of selector objects displayed in the first display object and includes a mapping between the first set of selector objects and one or more parameters of the first application, wherein a selector object is configured for input of a value of at least one of the one or more parameters mapped to that selector object;
means for identifying a second application, the second application being a computer executable program;
means for displaying, in the user interface, a second display object associated with a second application, wherein the second display object includes a second set of selector objects and includes a mapping between the second set of selector objects and one or more parameters of the second application; and
in response to receiving an indication of a user action that associates the second display object with the first display object, means for configuring the first application to invoke the second application; and
means for creating a third display object that includes the first set of selector objects and the second set of selector objects;
wherein the first display object that includes the first set of selector objects mapped to one or more parameters of the first application is displayed in the graphical user interface independent of an indication of a relationship between the first display object and the first application to which the first set of selector objects are mapped, independent of an indication of a relationship between the first set of selector objects and the first application to which the first set of selector objects are mapped and independent of an indication of a relationship between the first application and the second application.

* * * * *